US012804130B2

(12) United States Patent
Chen et al.

(10) Patent No.: US 12,804,130 B2
(45) Date of Patent: Nov. 17, 2026

(54) METHOD AND DEVICE OF VIDEO CODING USING LOCAL ILLUMINATION COMPENSATION (LIC) GROUPS

(71) Applicant: InterDigital VC Holdings, Inc., Wilmington, DE (US)

(72) Inventors: Ya Chen, Rennes (FR); Tangi Poirier, Thorigne-Fouillard (FR); Philippe Bordes, Laille (FR); Fabrice Leleannec, Mouaze (FR); Franck Galpin, Thorigne-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 55 days.

(21) Appl. No.: 18/600,358

(22) Filed: Mar. 8, 2024

(65) Prior Publication Data

US 2024/0214557 A1 Jun. 27, 2024

Related U.S. Application Data

(63) Continuation of application No. 17/277,973, filed as application No. PCT/US2019/051917 on Sep. 19, 2019, now Pat. No. 11,962,753.

(30) Foreign Application Priority Data

Sep. 19, 2018 (EP) .................................... 18306215
Sep. 26, 2018 (EP) .................................... 18306261
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/46* (2014.11)

(58) Field of Classification Search
None
See application file for complete search history.

(56) References Cited

U.S. PATENT DOCUMENTS 10,887,597 B2 * 1/2021 Liu ........................ H04N 19/51
2009/0257669 A1 10/2009 Kim et al.
(Continued)

FOREIGN PATENT DOCUMENTS

CN 105379288 A 3/2016
JP 2018-522466 A 8/2018
(Continued)

OTHER PUBLICATIONS

Bordes, "CE4-Related LIC with Reduced Memory Buffer", JVET-L0203-V3, Joint Video Expe1is Team (JVET) of ITU-T SG 16 WP 3 and ISO/IED JTC 1 /Sc 29/WG 11, 12th Meeting, Macao, China, Oct. 3, 2018, 6 pages.
(Continued)

*Primary Examiner* — Chikaodili E Anyikire
(74) *Attorney, Agent, or Firm* — Condo Roccia Koptiw LLP

(57) ABSTRACT

Described are methods and apparatuses wherein an illumination compensation parameter is determined for a current block of a picture. The illumination compensation parameter is determined from one or more illumination compensation parameters or from one or more reconstructed samples of at least one spatially neighbor block only in the case where said at least one spatially neighbor block belongs to the same local illumination compensation group as the current block, called current local illumination compensation group. Finally, the current block is reconstructed using the determined illumination compensation parameter.

17 Claims, 10 Drawing Sheets

(30) Foreign Application Priority Data

| | | |
|---|---|---|
| Oct. 8, 2018 | (EP) | 18306328 |
| Nov. 5, 2018 | (EP) | 18306446 |
| Dec. 10, 2018 | (EP) | 18290137 |
| Sep. 11, 2019 | (WO) | PCT/US2019/050510 |

(51) Int. Cl.

| | |
|---|---|
| ***H04N 19/176*** | (2014.01) |
| ***H04N 19/46*** | (2014.01) |

(56) References Cited

U.S. PATENT DOCUMENTS

| | | | | |
|---|---|---|---|---|
| 2010/0091845 | A1 | 4/2010 | Jeon et al. | |
| 2013/0194386 | A1 | 8/2013 | Leontaris et al. | |
| 2013/0243085 | A1 | 9/2013 | Mishourovsky et al. | |
| 2014/0010305 | A1 | 1/2014 | Mironovich et al. | |
| 2015/0023422 | A1 | 1/2015 | Zhang et al. | |
| 2018/0063531 | A1 | 3/2018 | Hu et al. | |
| 2018/0098086 | A1 | 4/2018 | Chuang et al. | |
| 2019/0215522 | A1* | 7/2019 | Zhang | H04N 19/159 |
| 2020/0099941 | A1 | 3/2020 | Li et al. | |
| 2020/0186830 | A1 | 6/2020 | Seregin et al. | |
| 2020/0221111 | A1* | 7/2020 | Seregin | H04N 19/105 |
| 2021/0051345 | A1* | 2/2021 | Tsai | H04N 19/52 |
| 2021/0076029 | A1* | 3/2021 | Han | H04N 19/107 |
| 2021/0227209 | A1 | 7/2021 | Liu et al. | |
| 2021/0266587 | A1* | 8/2021 | Liu | H04N 19/52 |
| 2021/0277517 | A1 | 9/2021 | Liu et al. | |
| 2021/0352309 | A1* | 11/2021 | Liu | H04N 19/52 |

FOREIGN PATENT DOCUMENTS

| | | | |
|---|---|---|---|
| KR | 10-2018-0016390 | A | 2/2018 |
| WO | 2015192372 | A1 | 12/2015 |
| WO | 2016/200779 | A1 | 12/2016 |
| WO | 2016200777 | A1 | 12/2016 |
| WO | 2018064492 | A1 | 4/2018 |

OTHER PUBLICATIONS

Chen, et al., "Description of SDR, HDR and 360 Video Coding Technology Proposal by Huawei, GoPro, HiSilicon, and Samsung", JVET-J0025_V2, Joint Video Exploration Team (JVET) of ITU-T SG 16 WP 3 and ISO/IEC JTC 1/SC 29/WG 11, 10th Meeting, San Diego, CA, United States, Apr. 10, 2018, 132 pages.

Chen, et al., "Low-Latency Illumination Compensation (IC) Encoding Algorithm", JCT3V-H0086, Joint Collaborative Team on 3D Video Coding Extensions of ITU-T SG 16 WP 3 and ISO/IEC Jtc 29/WG 11, 8th Meeting: Valencia. Spain, Mar. 29, 2014, 4 pages.

Chen, Jianle et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT; Editors; JVET-G1001-V1, Jul. 13-21, 2017, 48 pages.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

ITU-T, "Versatile Video Coding", Recommendation ITU-T H.266, Series H: Audiovisual and Multimedia Systems Infrastructure of Audiovisual Services—Coding of Moving Video, Aug. 2020, 516 pages.

ITU-T Recommendation H.262, "ITU-T Telecommunication Standardization Sector of International Telecommunication Union", Transmission of Non-Telephone Signals; Information Technology—Generic Coding of Moving Pictures and Associated Audio Information: Video, Jul. 1995, 211 pages.

Liu, et al., "Local Illumination Compensation", VCEG-AZ06, Qualcomm Incorporated, ITU—Telecommunications Standardization Sector Study Group 16 Question 6 Video Coding Experts Group (VCEG), 52nd Meeting, Warsaw, Poland, Jun. 19-26, 2015, 4 pages.

Recommendation ITU-T H.222.0, "ITU-T Telecommunication Standardization Sector of International Telecommunication Union", Series H: Audiovisual and Multimedia Systems Infrastructure of audiovisual services—Transmission multiplexing and synchronization, Information technology—Generic coding of moving pictures and associated audio information: Systems, Mar. 2017, 291 pages.

Tamse, et al., "[CE4.6.3—Inter Prediction Refinement in JVET-J0024]", JVET-K0118-V1, Joint Video Experts Team (JVET) of ITU-T SG 16 WP 3 and ISO/IEC JTC 1/SC 29/WG 11, 11th Meeting: Ljubljana, Slovenia, Jul. 10, 2018, 3 pages.

Tamse, et al., "CE4.7.1 and CE4.7.2—Non-Temporal Illumination Compensation in JVET-K1024", JVET-K0056-V1, Joint Video Experts Team (JVET) of ITU-T SG16 VVP3 and ISO/IED JTC 1/SC 29/WG 11, 12th Meeting: Macao, China, Oct. 3, 2018, 4 pages.

* cited by examiner

METHOD AND DEVICE OF VIDEO CODING USING LOCAL ILLUMINATION COMPENSATION (LIC) GROUPS

CROSS-REFERENCE TO RELATED APPLICATIONS

This application is a continuation of U.S. application Ser. No. 17/277,973 (now U.S. Pat. No. 11,962,753), which is a National Phase entry under 35 U.S.C. § 371 of International Application No. PCT/US2019/051917, filed Sep. 19, 2019, which claims priority from European Patent Application No. 18290137.1, filed Dec. 10, 2018, European Patent Application No. 18306446.8, filed Nov. 5, 2018, European Patent Application No. 18306328.8, filed Oct. 8, 2018, European Patent Application No. 18306261.1, filed Sep. 26, 2018, European Patent Application No. 18306215.7, filed Sep. 19, 2018, and International Application PCT/US2019/050510, filed Sep. 11, 2019 each of which are incorporated by reference herein in their entireties.

TECHNICAL FIELD

At least one of the present embodiments generally relate to a method and a device for picture encoding and decoding, and more particularly, to a method and a device for picture encoding and decoding with local illumination compensation.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

BRIEF SUMMARY

One or more of the present embodiments provide a method for encoding/decoding a picture with illumination compensation.

According to a general aspect of at least one embodiment, a decoding method is presented that comprises:

determining at least one illumination compensation parameter for a current block;

reconstructing said current block using said determined illumination compensation parameter;

wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to another general aspect of at least one embodiment, a decoding apparatus is presented that comprises one or more processors configured to implement:

determining at least one illumination compensation parameter for a current block;

reconstructing said current block using said determined illumination compensation parameter;

wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to another general aspect of at least one embodiment, an encoding method is presented that comprises:

determining at least one illumination compensation parameter for a current block;

reconstructing said current block using said determined illumination compensation parameter;

wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to another general aspect of at least one embodiment, an encoding apparatus is presented that comprises one or more processors configured to implement:

determining at least one illumination compensation parameter for a current block;

encoding said current block using said determined illumination compensation parameter;

wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

DETAILED DESCRIPTION

Figure 1:
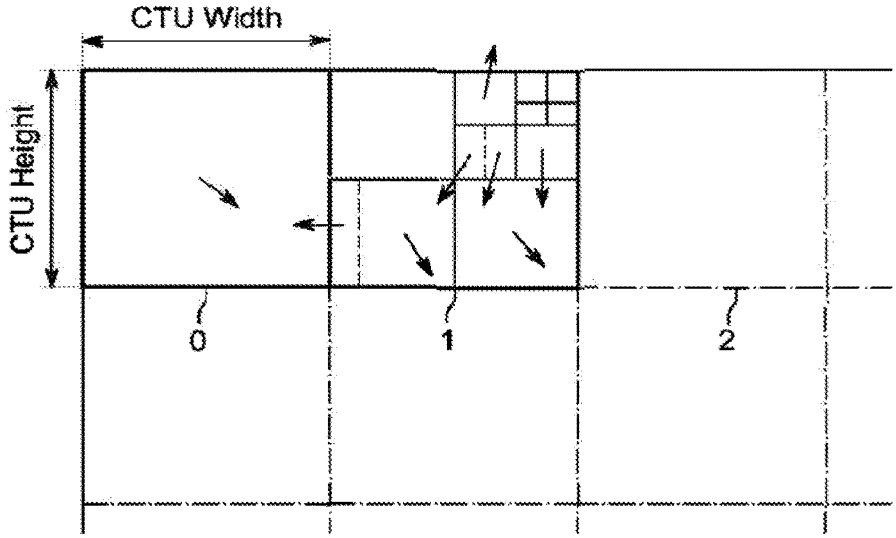
FIG. 1 depicts a Coding Tree Unit (CTU) partitioned into smaller Units.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height as depicted on FIG. 1. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a CU that may be further split into smaller CUs also named sub-CUs or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. There is no partitioning of a CB into PBs and TBs, i.e. a CU is made of a single PU and a single TU.

An image can be partitioned into slices or tiles. Each slice or tile is a group of CUs and/or may contain fractional CUs.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "frame", "slice" or "tile" may be used interchangeably. Usually, but not necessarily, the term "reconstructed" is used at the encoder side while "decoded" is used at the decoder side.

For coding a CU, a prediction block is built from neighboring reconstructed samples (intra prediction) or from previously reconstructed pictures stored in the Decoded Pictures Buffer (DPB) (inter-prediction). Next, the residual samples calculated as the difference between original samples and PU samples are transformed and quantized. In inter-prediction, motion compensated temporal prediction is employed to exploit the redundancy that exists between successive pictures of a video. To do so, a motion vector and a reference index 0 (refIdx0) indicating which reference picture of LIST_0 to use are associated with the PU. Possibly, several PUs can be combined together to form one final PU (e.g. bi-prediction, generalized bi-prediction or multi-hypothesis prediction)

In the Joint Exploration Model (JEM) developed by the JVET (Joint Video Exploration Team) group, additional temporal prediction tools with associated parameters determined at the decoder side were introduced that include the Local Illumination Compensation (LIC). Basically, the purpose of LIC is to compensate for illumination change which may occur between a predicted block and its reference block employed through motion compensated temporal prediction.

Figure 2:
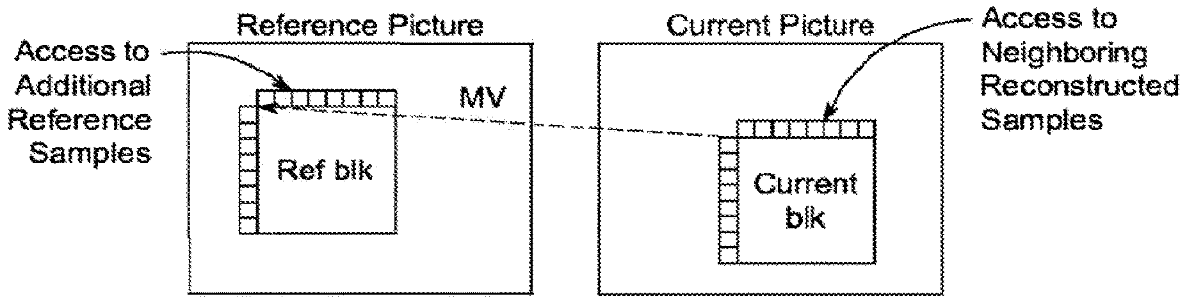
FIG. 2 illustrates the principle of local illumination compensation (LIC) parameters derivation for a current block from neighboring reconstructed samples and corresponding collocated reference samples in case of "JEM-LIC"

The use of LIC is typically signaled on the CU level, through a flag (LIC flag) associated with each coding unit (CU) coded in inter. According to this tool, the decoder computes some prediction parameters based on some reconstructed picture samples, localized on the left and/or on the top of the current block to be predicted and reference picture samples localized on the left and/or on the top of the motion compensated block (FIG. 2). In JEM, the use of LIC for a given block depends on a flag associated with this block, called the LIC flag. Throughout this document, this technique is referred to as the "JEM-LIC".

The LIC parameters (weight=a, offset=b) are determined by minimizing a local distortion defined as follows:

$$dist=\sum_{r\in Vcur,s\in Vref}(rec\_cur(r)-a\cdot rec\_ref(s)-b)^2 \quad \text{(Eq. 1)}$$

where: rec_cur(r) is a neighboring reconstructed sample
- rec_ref(s) is a reference sample
- Vcur are reconstructed samples neighbor to current CU,
- Vref are reconstructed samples neighbor to reference samples used to build PU.

Once the LIC parameters are obtained by the encoder or the decoder for the current CU, then the prediction pred (current_block) of current CU is determined as follows (uni-directional prediction case):

$$pred(current\_block)=a\times ref\_block+b \quad \text{(Eq. 2)}$$

Where current_block is the current block to predict, pred (current_block) is the prediction of the current block, and ref_block is the reference block used for the temporal prediction of the current block.

One drawback of this basic approach is that it necessitates that the encoder/decoder accesses the reconstructed samples of already reconstructed top and left neighboring blocks. This aspect is undesirable, mainly because it introduces some latency in the motion compensation process, increases the memory bandwidth (access to additional reference and reconstructed neighboring samples as depicted in FIG. 2) and potentially breaks some existing decoder pipeline architectures.

Figure 3:
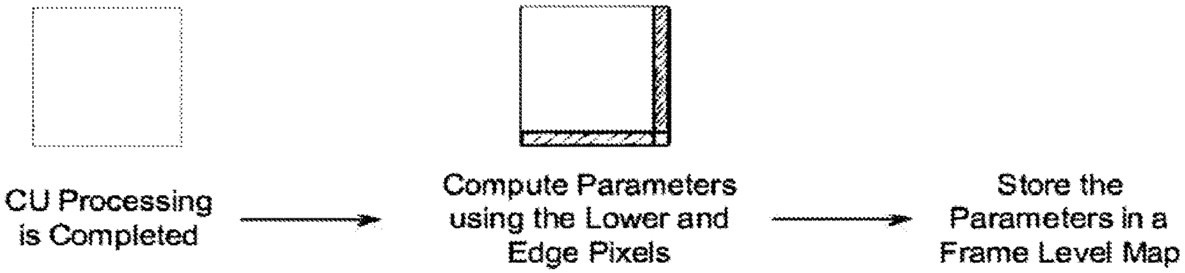
FIG. 3 illustrates the LIC parameters computation process in case of "VVC-LIC"

To cope with these issues, the LIC parameters can be computed in a way that avoids accessing these additional samples. To do so, the LIC parameters are computed after each CU reconstruction at lower edge and right edge of current CU and stored so that they can be re-used by subsequent CUs to perform LIC compensation (FIG. 3). Throughout this document, this technique is referred to as the "WVC-LIC".

Figure 4:
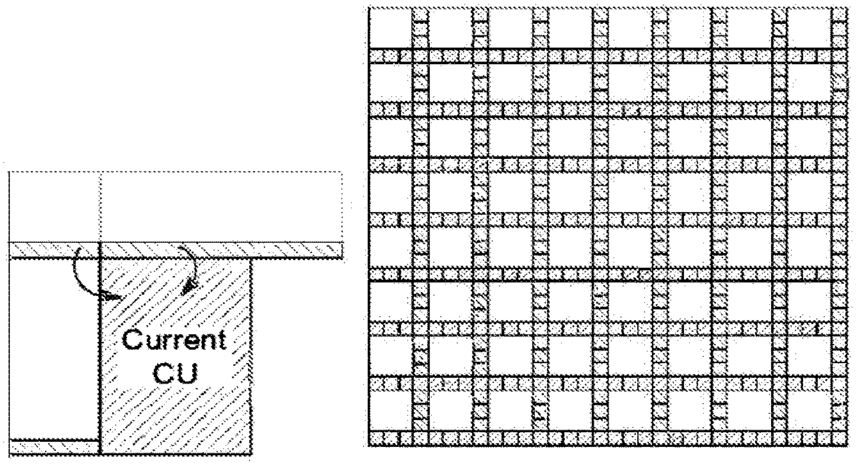
FIG. 4 illustrates, on the left, the LIC parameters derivation in case of "VVC-LIC" from above stored LIC parameters and illustrates, on the right, vertical (in dark grey) and horizontal (in light grey) LIC parameters stored at frame level at 4×4 resolution.

However, one main drawback of this last approach is that it stores LIC parameters after each CU reconstruction, for the whole slice or picture, which leads to increased memory consumption (FIG. 4) and increased processing amount in the decoding process. On the left of FIG. 4, the LIC parameters for the current CU are determined from above stored LIC parameters. On the right of FIG. 4, vertical (in dark grey) and horizontal (in light grey) LIC parameters are stored at frame level at 4×4 resolution.

Figure 5:
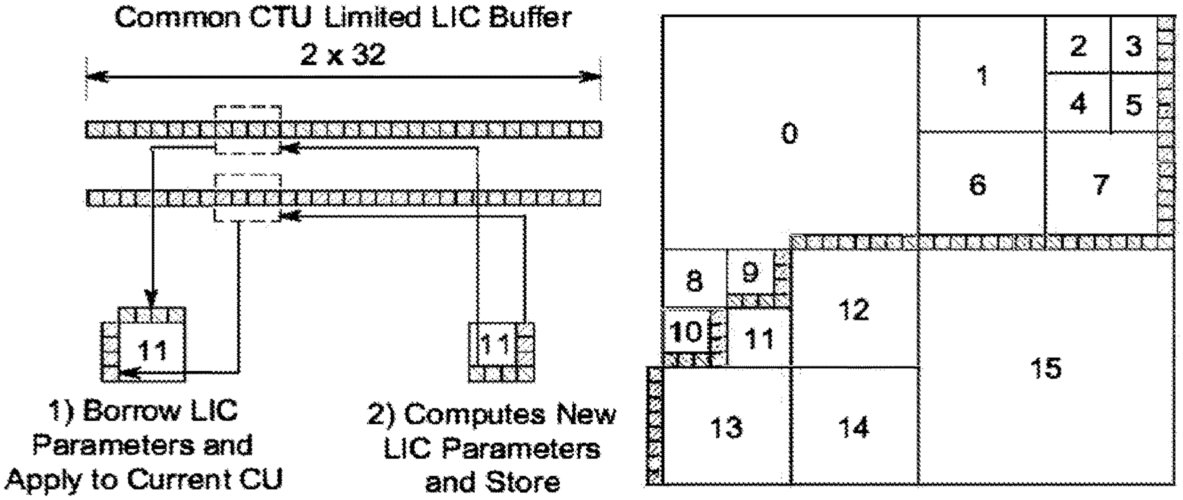
FIG. 5 depicts a CTU of size 128×128 and the 32×2 stored LIC parameters in case of "WVC-LIC"

In case of "VVC-LIC", memory needs may be reduced by storing LIC parameters into a common LIC buffer used for decoding all the CTUs. The LIC buffer includes one single column of size equal to CTU's height and one single row of size equal to CTU's width as depicted in FIG. 5. At the end of processing of each CU, LIC parameters are computed on bottom and right borders, for each color component and each reference list. They are then stored in a common LIC buffer to be possibly accessed by subsequent CUs (on the right or below the current CU). At the CU prediction stage, LIC parameters are accessed in the common LIC buffer. The row buffer contains the LIC parameters computed with neighboring above CUs and the column buffer contains and LIC parameters computed with neighboring left CUs as depicted in FIG. 5.

If the minimum CTU size is 4×4, all the LIC parameters are stored in one LIC buffer of size (CTU-width/4) for top LIC parameters, and one LIC buffer of size (CTU-height/4) for left LIC parameters, for the 3 color components (FIG. 5) and the 2 reference lists.

Determining LIC Parameters to Use at PU Reconstruction

In inter uni-directional mode, a PU is built by motion compensating a block of samples in a previously reconstructed reference picture stored in the Decoded Picture Buffer (DPB). The DPB is comprises two lists of reference pictures (L0 and L1) and each reference picture is associated with a index (refIdx). In bi-prediction, two prediction blocks are built from two reference pictures of L0 and L1 using two reference indexes (refIdx0, refIdx1). When LIC is enabled for a current CU, the LIC parameters are copied from the LIC parameters computed from one top (or one left) reconstructed CU which are stored in the common row (or column respectively) LIC buffer in case of "VVC-LIC". The LIC parameters are determined from the reconstructed top and left samples in case of "JEM-LIC".

Figure 6:
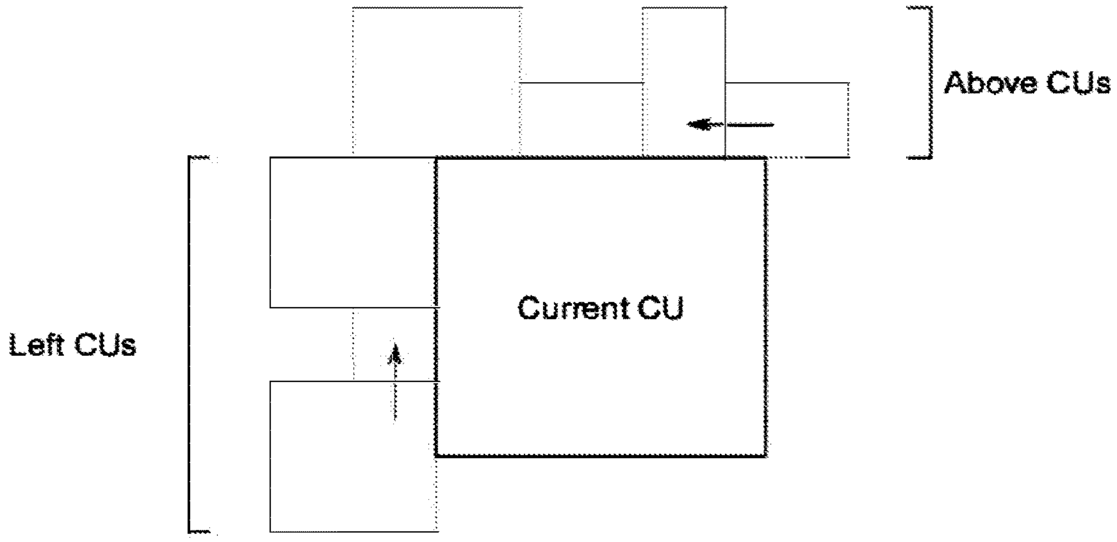
FIG. 6 depicts a current Coding Unit (CU) and its left and above neighboring CUs.

In case of "VVC-LIC", since both the top and left LIC parameters may be available but may be different, a pruning is performed to obtain a single LIC model. Intra coded CU neighbours are discarded in the pruning process. Next, the neighbours which have trivial model [weight=1 and offset=0] are discarded in the pruning process. If no model is remaining, a trivial model is used. If model(s) still remain, the neighbours with the same reference index as the current CU are given higher priority. If multiple neighbours have the same reference index, the top-right (or bottom-left) neighbour is given higher priority compared to the top-left (or bottom-top) neighbour (FIG. 6).

In a variant, the neighbor whose MV is the closest to MV of the current CU is given higher priority. On FIG. 6, above and left neighbors are scanned from top-right to top-left and from bottom-left to top-left in order to find the neighbor with same reference index as the current PU if any.

The same pruning principle can be applied to "JEM-LIC". In that case, the reconstructed samples used to compute LIC parameters are those corresponding to the CU given higher priority.

Figure 7:
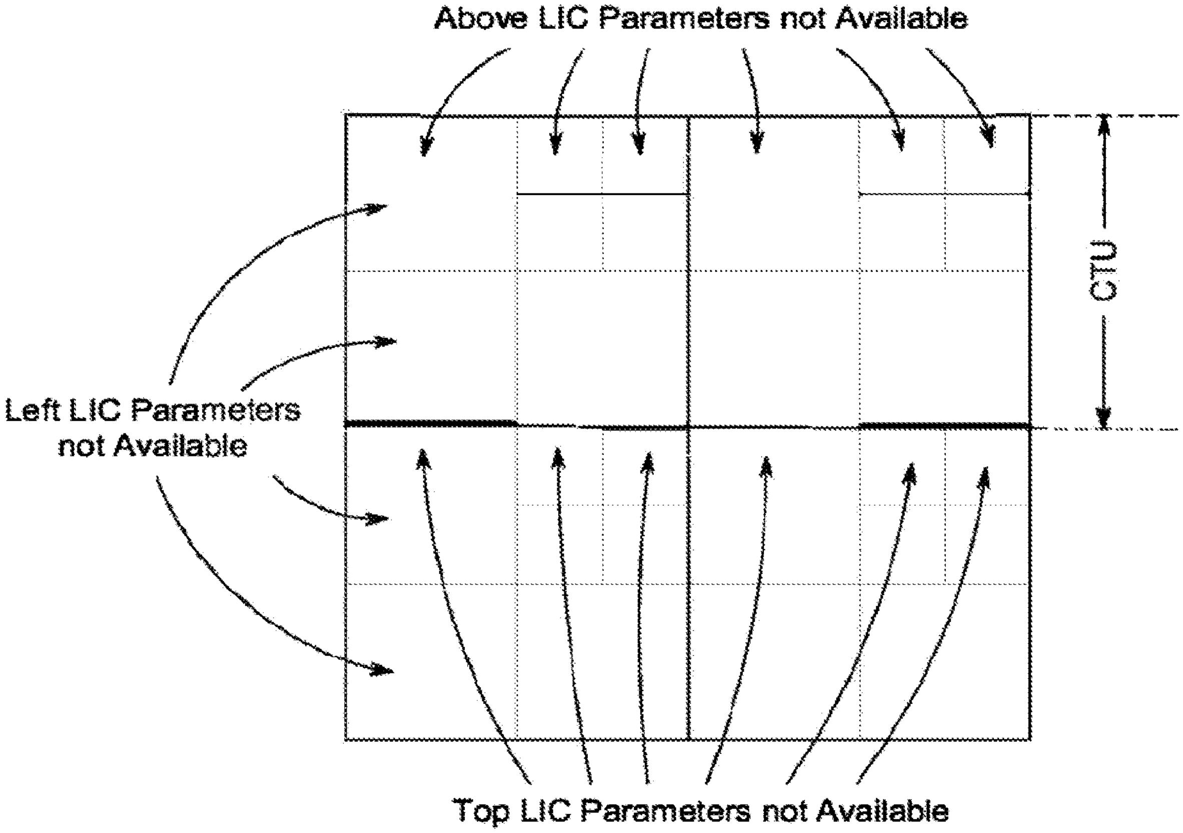
FIG. 7 depicts a CTUs partitioned into CUs and illustrates the principle of non-availability of LIC parameters for some of them in case of "WVC-LIC" or non-availability of neighboring reconstructed samples in case of "JEM-LIC"

In case of "VVC-LIC", before reconstructing one CTU, the LIC buffer storing top LIC parameters is reset to default so that LIC is disabled for the CUs on top of current CTU. When starting reconstructing one row of CTUs, the LIC buffer storing left LIC parameters is reset to default so that LIC is disabled only if the CTU is the first CTU in one row (FIG. 7). On FIG. 7, above LIC parameters are not available for CUs located on top of CTU. Besides, the LIC parameters are not computed for the CUs at the bottom of the CTU because for the CTU below, the access to above LIC parameters is not allowed (FIG. 7).

"VVC-LIC" and "JEM-LIC" methods introduce dependency in decoding an inter CU. Indeed, in the case where LIC-flag=true the current CU needs to wait for the left and above CUs to be decoded before its own decoding starts. In addition, the "VVC-LIC" method increases the amount of calculation by computing LIC parameters after each CU reconstruction (bottom and right edges) even if the right or bottom CU does not use LIC. Finally, The LIC-flag is also costly to code.

At least one embodiment proposes to reduce the pipeline dependency introduced by LIC in decoding CU in inter by adding some restrictions in LIC process.

At least one embodiment proposes adding signaling for improving coding efficiency and speed-up decoding process.

Embodiment-1

Figure 8:
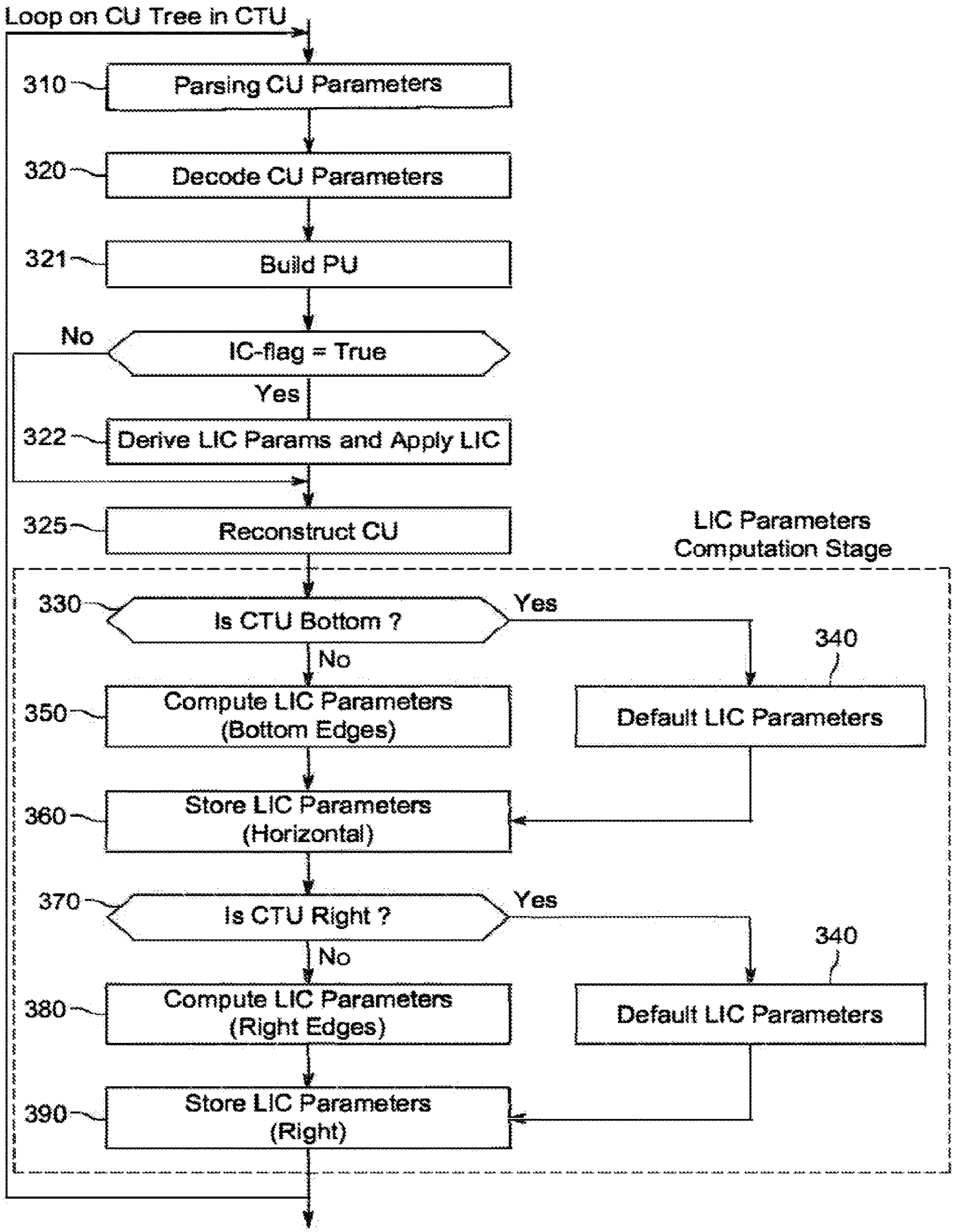
FIG. 8 depicts a flowchart of a method for decoding a CU in case of "VVC-LIC" according to one embodiment.

FIG. 8 represents a flowchart of a method for decoding a current CU in case of "VVC-LIC" according to a specific and non-limiting embodiment. First the syntax elements associated with the current CU are parsed from the bitstream (310) and CU parameters are decoded (320). This include the decoding of CU parameters explicitly coded (e.g.: IC-flag) in the bitstream and the others CU parameters inferred from other syntax elements (e.g. in merge mode, where the IC-flag is inferred from the IC-flag of a neighboring CU from which the current CU inherits). Next, the prediction PU (motion compensation) is built (321). If IC-flag=true, the LIC parameters are determined from the LIC buffer (322) in case of "VVC-LIC" and Illumination Compensation is applied on the Prediction (PU), i.e. the current CU uses said determined illumination compensation parameter for its reconstruction. Next, the CU is reconstructed by adding residuals to the prediction PU (325).

The next steps (330-390) deal with the calculation and storage of LIC parameters to be possibly used by subsequent CUs. If the current CU is located at the bottom of the current CTU (330), then horizontal LIC parameters are set to defaults (340), else the horizontal LIC parameters are computed with the reconstructed samples of the current CU located at the bottom of the current CU (350). They are then stored in the horizontal LIC buffer (360). If the current CU is located at the right of the current CTU (370), then vertical LIC parameters are set to defaults (340), else the vertical LIC parameters are computed with the reconstructed samples of the current CU located at the right of the current CU (380) and they are stored in the vertical LIC buffer (390).

This embodiment also applies to "JEM-LIC" except the steps 330-390 which are specific to VVC-LIC. In case of VVC-LIC, in the step 322 the LIC parameters for the current CU are derived from the LIC buffer. In case of JEM-LIC, in the step 322 the LIC parameters for the current CU are derived from the neighboring reconstructed samples.

Embodiment-2

At least one embodiment proposes additional conditions for limiting the video pipeline dependency introduced when decoding CU coded in inter mode with LIC mode enabled (LIC flag=true).

To make the decoding of CUs coded in inter mode in one CTU independent from the decoding of CUs inside another CTU, the inheritance of LIC parameters calculated from other CU is constraint to be inside the same CTU as current one. In other word, one CU can inherit LIC parameters from another CU only if this CU is in same CTU as the current CU.

Figure 9:
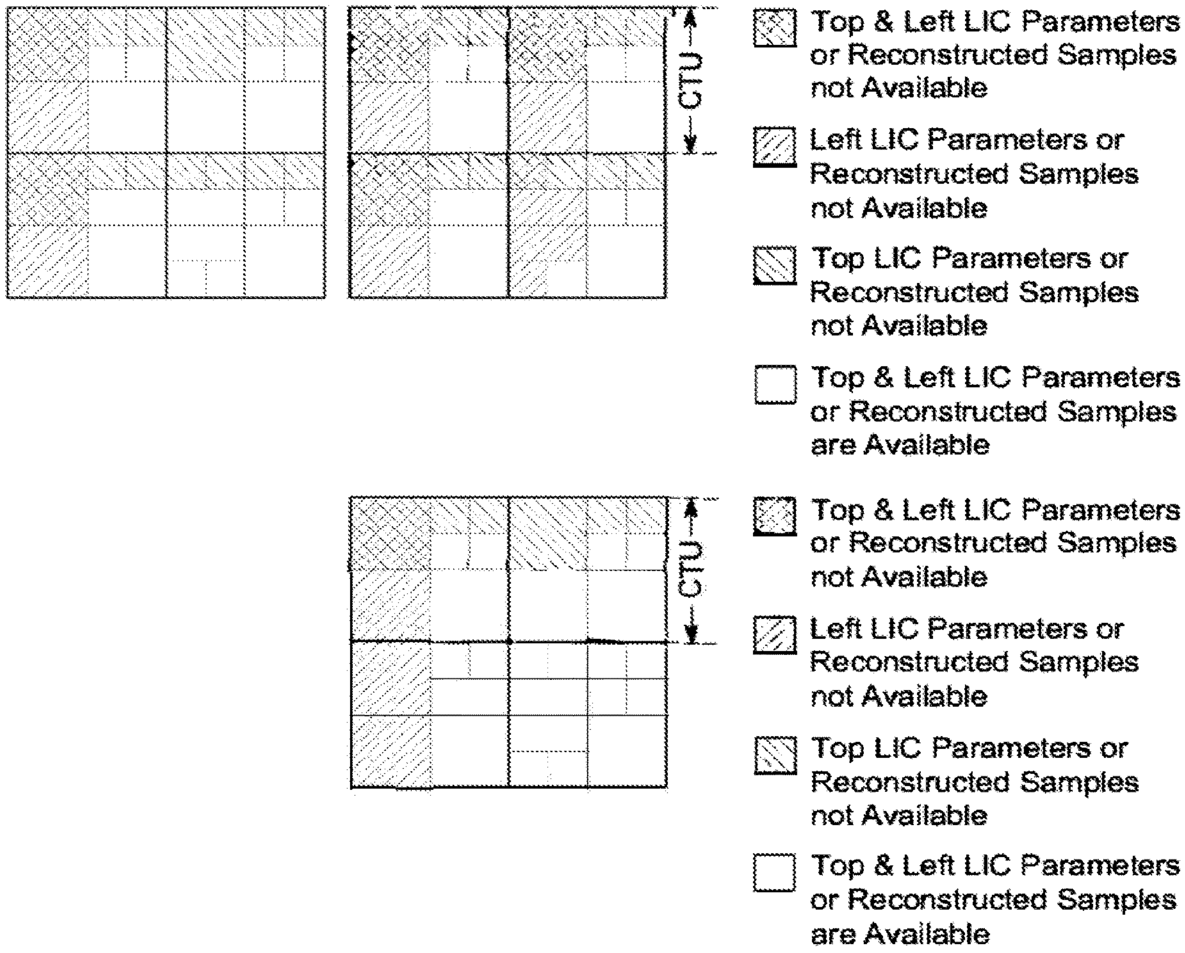
FIG. 9 depicts CTUs partitioned into CUs and illustrates the principle of LIC parameters access restriction according to various embodiments in case of "VVC-LIC" or "JEM-LIC"

Practically, in case of "WVC-LIC", this can be implemented by filling the LIC parameters of the vertical buffer (see dark grey buffer in FIG. 5) with default LIC values (340) (weight=1, offset=0) at the start of decoding the current CTU (370,380). This can also be implemented by disabling LIC for the top-left CU in the CTU. In case of "JEM-LIC", this can be implemented by disabling usage of reconstructed samples outside the current CTU in Eq. 1. FIG. 9 depicts LIC parameters inheritance ("VVC-LIC" case) or reconstructed samples access ("JEM-LIC" case) restrictions corresponding various embodiments. On the top-right of FIG. 9, the LIC parameters access or reconstructed samples access is restricted to the current CTU. On the top-left and bottom of FIG. 9, the LIC parameters access or reconstructed samples access is allowed at left except for the first CUs in one image row, but access to top LIC parameters or top reconstructed samples is restricted to the current CTU in the top-left of FIG. 9.

Embodiment-3

In at least one embodiment, one defines LIC-groups where the LIC parameters can be inherited or computed from CU in the same LIC-group only. By doing so, one makes the decoding of some CUs coded in inter mode in one LIC-group independent from the decoding of other CUs in another LIC-group. This allows decoding different CUs in inter mode by separate threads. When the LIC-group is the CTU, embodiment-3 is same as embodiment-2 (top-right of FIG. 9). The LIC-group size can be determined by the VPU (Video Processing Unit) or VDPU (Video Data Processing Unit) or HU (Hardware Unit) that is the maximum sample size the hardware can process all-in-one.

In a variant, the LIC-group or the VPU is coded in the bitstream in a Sequence header (e.g. SPS, SPS stands for Sequence Parameter Set) or picture/slice header (e.g. PPS, PPS stands for Picture Parameter Set).

As an example, the size of "LIC-groups" can be 64×64 or 128×128 or 256×128 or 256×256 when the size of CTU is 128×128. Therefore, the LIC-group can be a CTU, can be smaller than a CTU or larger than a CTU.

In a variant, the LIC-flag is not coded and is inferred to false for the top-left CU in the LIC-group. Said otherwise, in the case where the current block is not located at a top-left position in the same local illumination compensation group, a flag is decoded indicating whether reconstructing the current block uses the determined illumination compensation parameter.

In another variant, the LIC-flag is not coded and is inferred to false for the CUs in the LIC-group for which all the top neighbors or left neighbors are coded in intra mode. Said otherwise, in the case where at least one block located above or located to the left of the current block is coded in inter mode, a flag is decoded indicating whether reconstructing said current block uses said determined illumination compensation parameter.

Embodiment-4

Figure 12A:
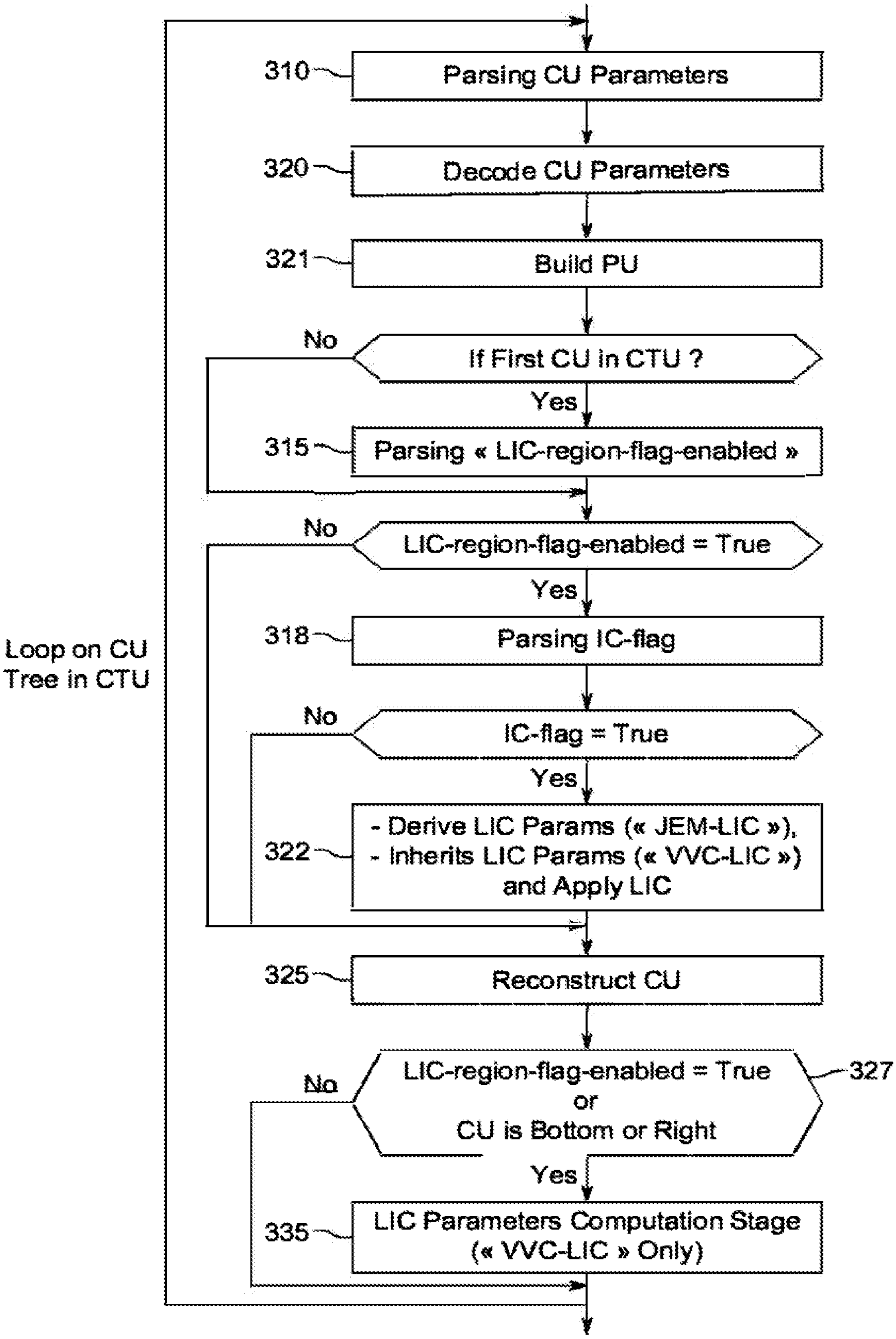
FIGS. 12A and 12B depicts flowcharts of a decoding method according to various embodiments.

FIG. 12A depicts a flowchart of a decoding method according to one embodiment. More precisely, FIG. 12A illustrates the decoding of LIC-group-flag-enabled for CUs belonging to a LIC-group which is a group of CUs. In this example, the LIC-group corresponds to one CTU. One defines another LIC-group. One decodes a flag (LIC-group-flag-enabled) (315) indicating whether at least one CU in the LIC-group uses LIC for computing prediction. This can be used with "JEM-LIC" or "VVC-LIC".

Next, the prediction PU (motion compensation) is built (321). If IC-flag=true and LIC-group-flag-enabled, the LIC parameters are determined from the LIC buffer (322) and Illumination Compensation is applied on the Prediction (PU). Next, the CU is reconstructed by adding residuals to the prediction PU (325).

Figure 10:
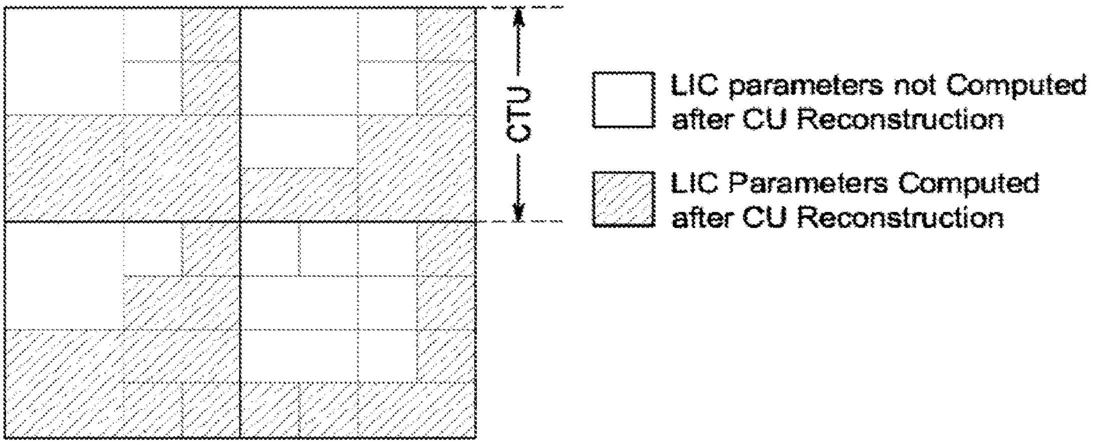
FIGS. 10 and 11 depicts CTUs partitioned into CUs and illustrates the principle of LIC-group according to various embodiments.

Defining such a flag improves the coding efficiency because in the case where LIC-group-flag-enabled is equal to false then:

a) the LIC-flag is not decoded for the CUs inside the LIC-group but inferred to false (320).
b) it speeds-up the decoder because the LIC is not applied on the PU for the CUs inside the LIC-group-2 (322).
c) In case of "VVC-LIC", it also speeds-up the decoder because the LIC parameters are not computed (335) for the CUs inside the LIC-group, except if they are right or bottom to the LIC-group (327) (FIG. 10).

This embodiment is independent from the other embodiments 1-3 but it can also be combined with embodiments 1-3. In the first case, the "LIC-group-flag-enabled" is coded and applies: for a CU with IC-flag=true, there is no restriction on the derivation of LIC parameters as in embodiments 1-3. In the second case, the "LIC-group-flag-enabled" is coded and applies: for a CU with IC-flag=true, the restrictions on the derivation of LIC parameters are the same as in embodiments 1-3.

On FIG. 10, in the case of "VVC-LIC" where LIC-group-flag-enabled is equal to false, then LIC parameters are not computed for the CUs inside the LIC-group (white CUs), except if they are right or bottom to the LIC-group (grey CUs). Here, one group corresponds to one CTU.

In a variant, in case of "VVC-LIC", the flag (LIC-group-flag-enabled) indicates whether the LIC parameters should be computed and stored after reconstructing the CUs of the LIC-group.

Embodiment-5

Figure 11:
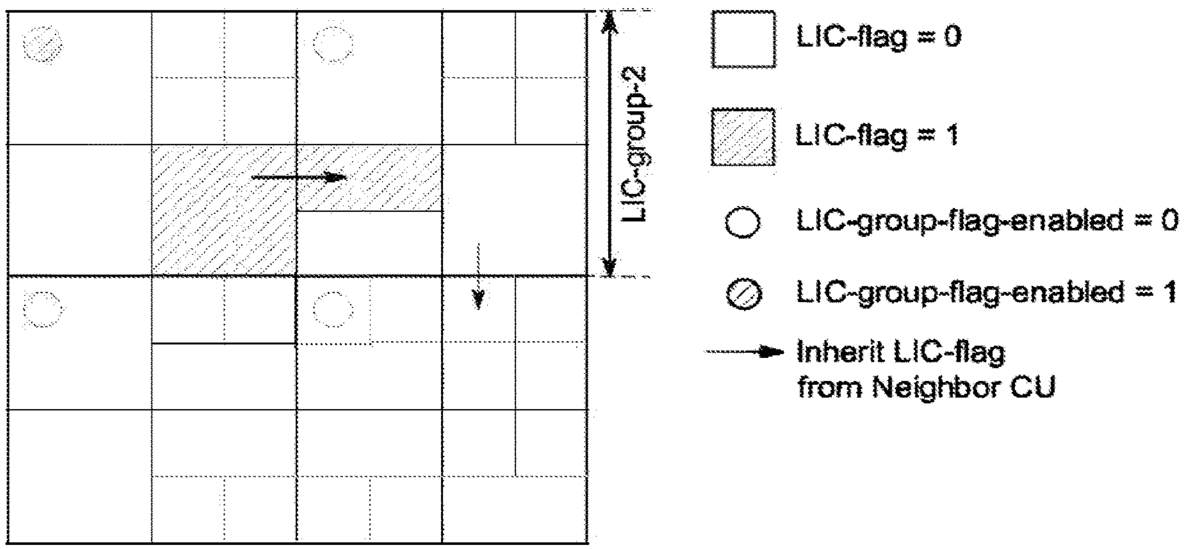
Figure 12B:
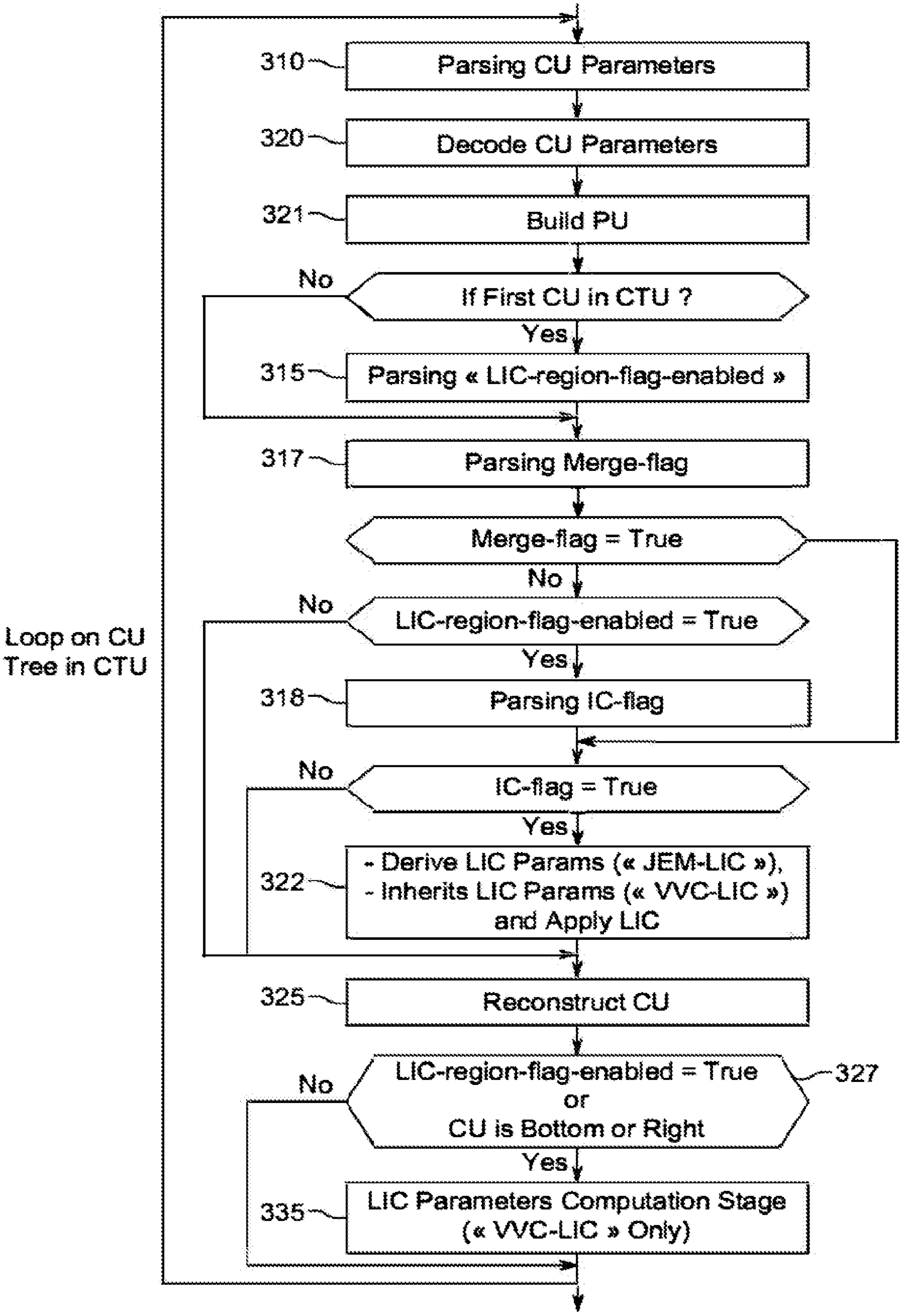

In a variant of embodiment 4 depicted in FIG. 12B, the semantic of LIC-group-flag-enabled is changed. It indicates whether at least one CU has LIC-flag value which is true when LIC-flag is explicitly coded (318) (not inherited by "merge mode") in the LIC-group. In this case, the CUs which inherits their value of LIC-flag from other CUs ("merge mode": 317 merge-flag=true) and for which LIC-flag is not coded are not considered by LIC-group-flag-enabled. For example, one can have LIC-group-flag-enabled=false in one LIC-group and one CU inheriting LIC-flag=true from one neighbor CU (FIG. 11). LIC-group-flag-enabled=true indicates that there is at least one CU in the LIC-group for which the value of LIC-flag is explicitly coded (not inherited by merge) and for which LIC-flag is equal to true (top-left CTU in the FIG. 11). LIC-group-flag-enabled=false indicates that all the CUs in the LIC-group for which the value of LIC-flag is explicitly coded (not inherited by merge) have LIC-flag equal to false, but it may have CUs with LIC-flag equal to true when they inherit value of LIC-flag (merge mode) (top right CTUs in the FIG. 11).

Embodiment-6

In a variant, the "LIC-group-flag-enabled" is coded with the first CU in the group of CUs which is coded in inter mode. In that way, if all the CU are coded in intra, then the flag "LIC-group-flag-enabled" is not coded and inferred to false.

In another variant, the "LIC-group-flag-enabled" is coded with the first CU in the group which is coded in inter and not in merge mode. In that way, if all the CUs are coded in intra, or inter-merge then the flag "LIC-group-flag-enabled" is not coded and inferred to false.

In a variant, the value of "LIC-group-flag-enabled" does not modify the value of "LIC-flag" for CU in inter-merge mode. The CU in inter-merge mode infers the value of LIC-flag from the LIC-flag of the reconstructed CU it inherits other coding parameters.

In a variant, if the value of "LIC-group-flag-enabled" is false, then the value of "LIC-flag" is inferred to false for all CUs (in inter and in inter-merge mode). In this case, the CU in inter-merge mode infers the value of LIC-flag to false.

Embodiment-7

In a variant of embodiment 4, one defines a minimal CU size "minCUsize" and the LIC-group-flag-enabled indicates whether at least one CU of size inferior to "minCUsize" in the LIC-group uses LIC for computing prediction. In that way, if LIC-group-flag-enabled is equal to false, the LIC-flag is not coded for the CUs with size inferior to "minCU-size".

In a variant, LIC-group-flag-enabled indicates whether at least one CU of size superior to "minCUsize" in the LIC-group uses LIC for computing prediction. In that way, if LIC-group-flag-enabled is equal to false, the LIC-flag is not coded for the CUs with size superior to "minCUsize"

Advantageously, the value "minCUsize" is coded in the bitstream in SPS, PPS or slice header for example. An example of "minCUsize" can be 4×4 or 8×8 typically.

Embodiment-8

The embodiments 1, 2, 3, 4, 5, 6, 7 can also be applied and combined to the case of "JEM-LIC" and "VVC-LIC" techniques, except that the LIC parameters are not computed after CU reconstruction for "JEM-LIC". The restrictions on access of LIC parameters in top-horizontal LIC buffer or left-vertical LIC buffer for "VVC-LIC" corresponds to restrictions on access of reconstruction samples located above or at left of current CU for "JEM-LIC" respectively.

Embodiment-9

Figure 13:
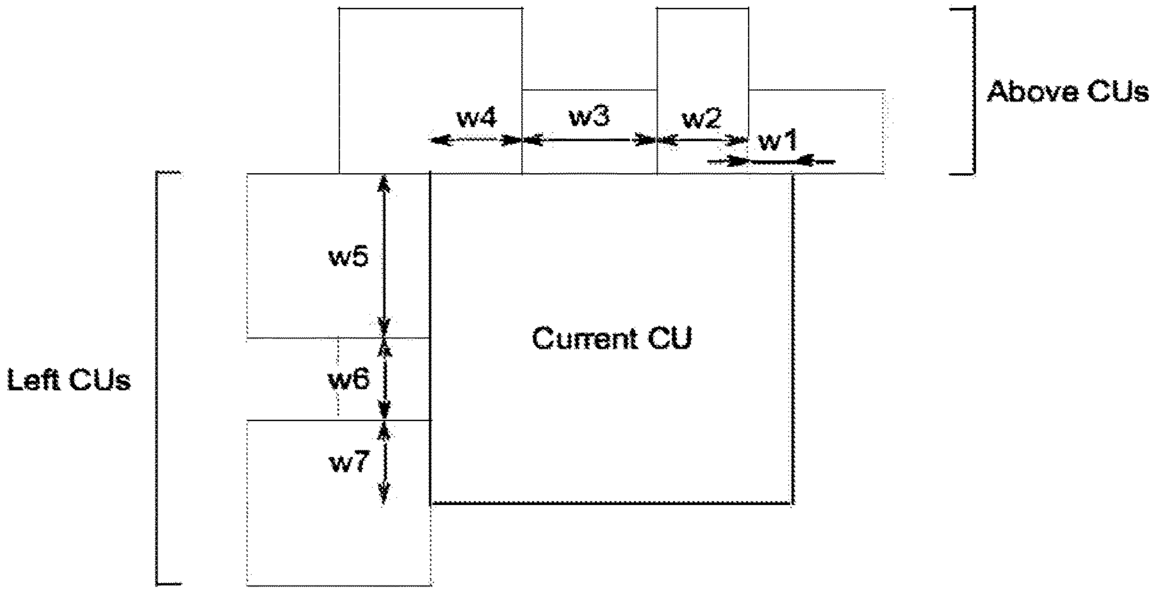
FIG. 13 depicts a current CU and its neighboring CUs and illustrates the principle of LIC parameters derivation according to one embodiment.

In case of "VVC-LIC" or "JEM-LIC", in the process of selecting the LIC parameters (or reconstructed samples respectively) from neighboring CUs (FIG. 6) one builds the list of LIC parameters (or reconstructed samples respectively) associated with CUs with same reference index and in case of "VVC-LIC" the LIC parameters to use for current CU is an average of these LIC parameters. In a "WVC-LIC" variant, the average is a weighted average where the weights are proportional to the neighboring CU width (CUs above) or neighboring CU height (CUs left). In a variant, the weights are proportional to the length of the common frontier with current CU as depicted in FIG. 13 for weights w1 and w7.

In a variant, the LIC parameters (or reconstructed samples respectively) of the neighbor whose MV is the closest to current MV of the current CU are used (to compute LIC parameters respectively) for the current CU.

The various embodiments make the decoding of CUs coded in inter mode in one LIC-group, e.g. one CTU, independent from the decoding of CUs inside another LIC-group. The inheritance of LIC parameters calculated from other CU ("VVC-LIC") or the set of reconstructed samples used to derive LIC parameters ("JEM-LIC") is constraint to be inside the same LIC-group as current one. In other word, one CU can inherit LIC parameters or use reconstructed samples from another CU only if this CU is in same LIC-group as the current CU.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 14:
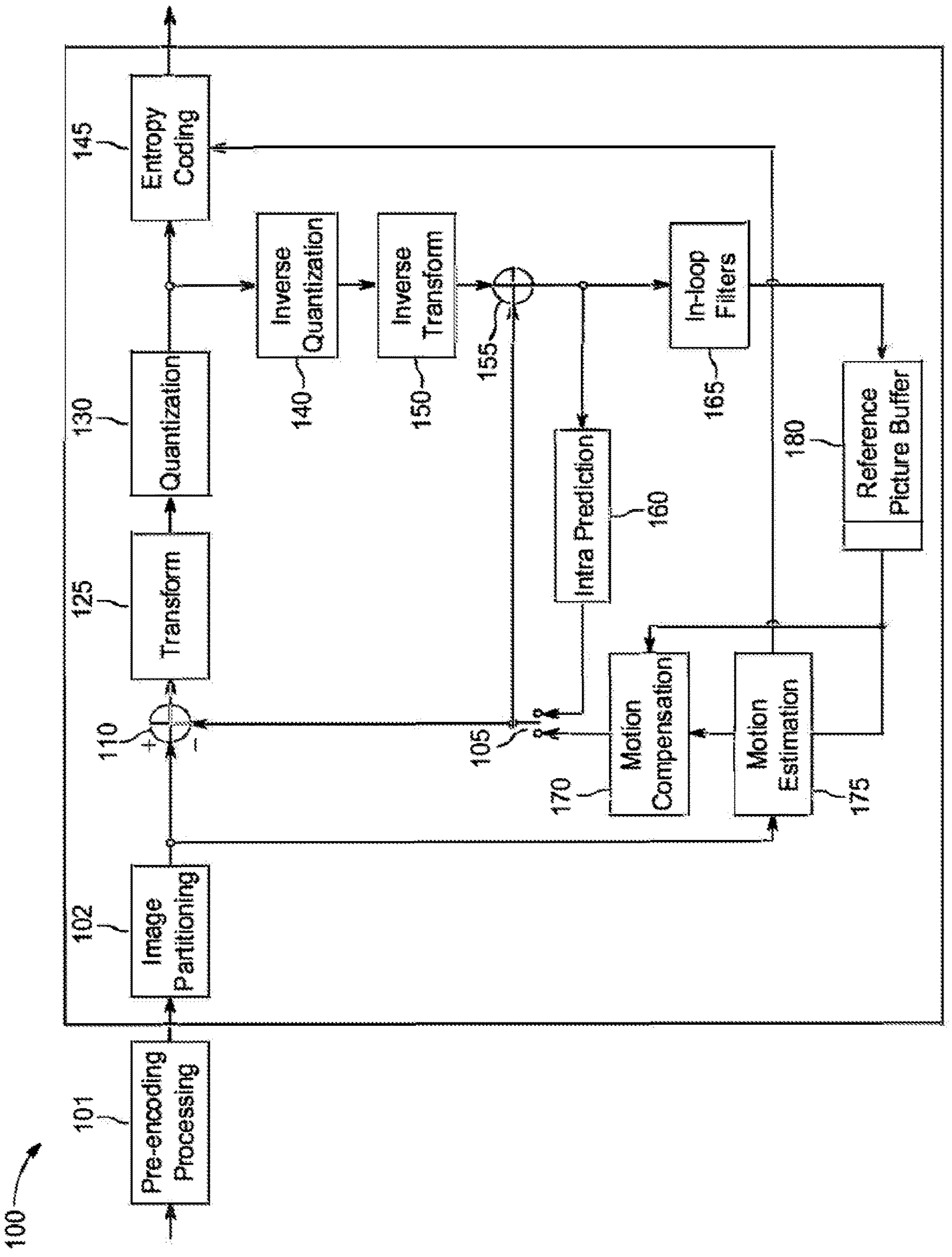
FIG. 14 illustrates a block diagram of a video encoder according to an embodiment.
Figure 15:
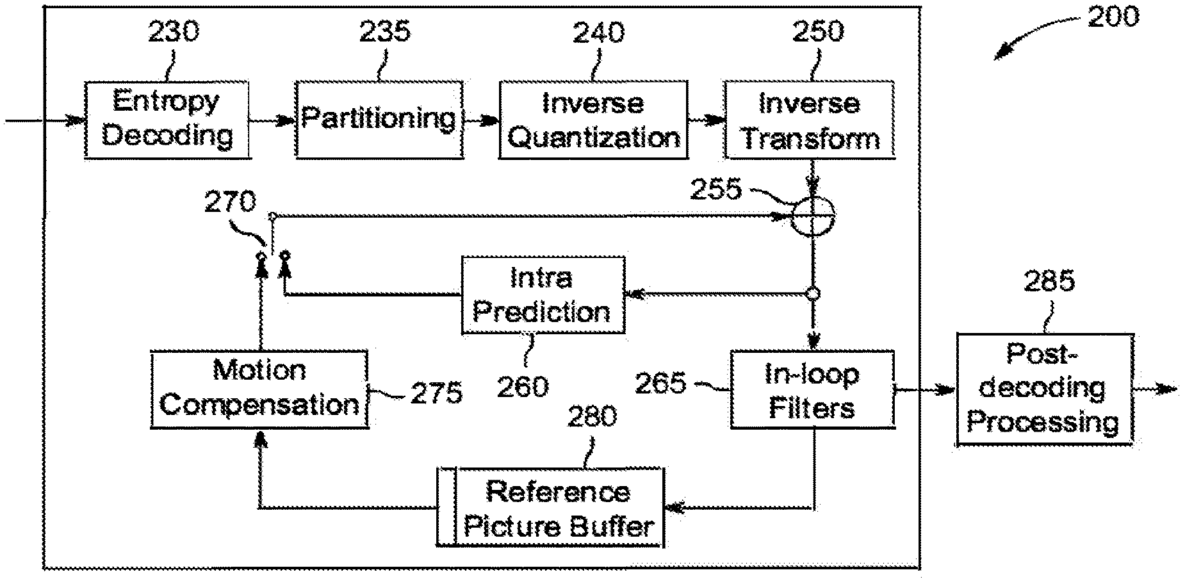
FIG. 15 illustrates a block diagram of a video decoder according to an embodiment.
Figure 16:
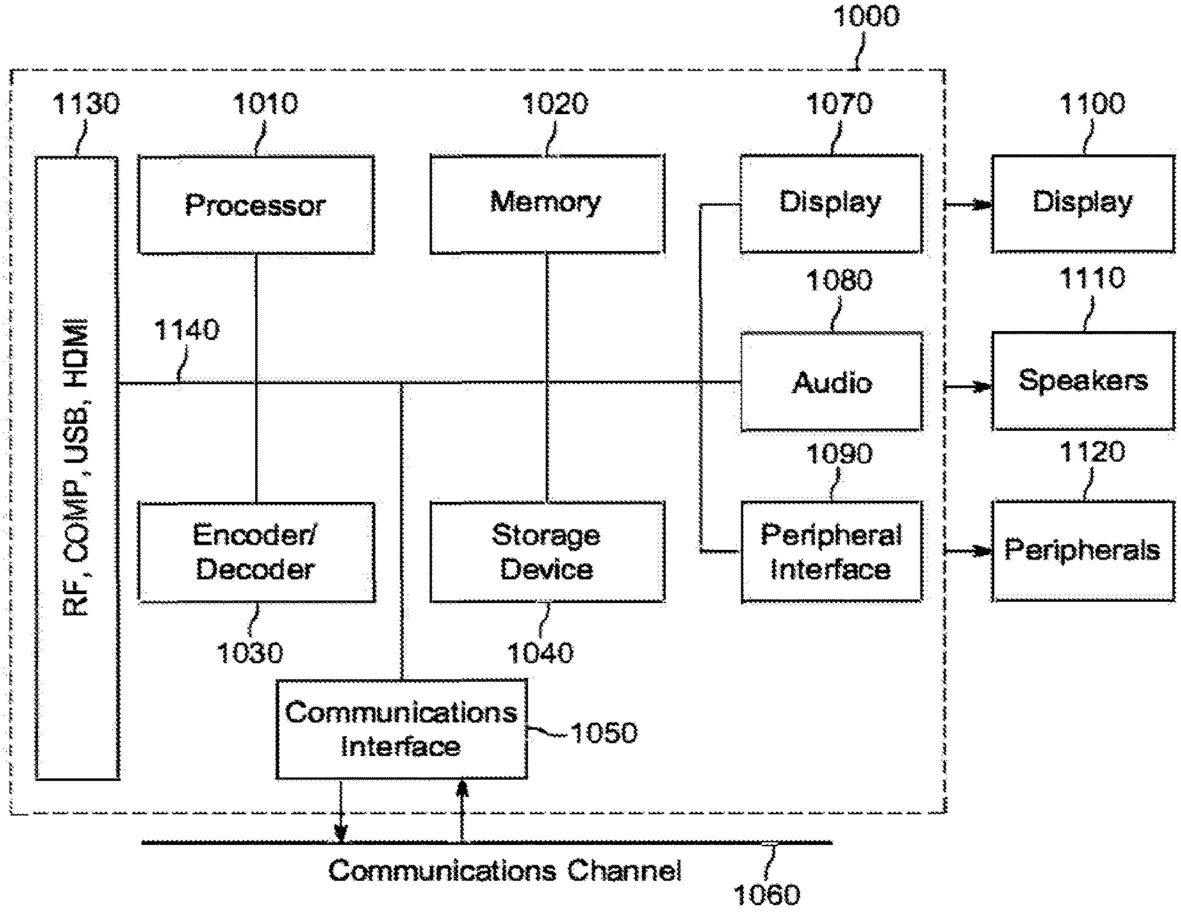
FIG. 16 illustrates a block diagram of an example of a system in which various aspects and embodiments are implemented.

The aspects described and contemplated in this application can be implemented in many different forms. FIGS. 14, 15 and 16 below provide some embodiments, but other embodiments are contemplated and the discussion of FIGS.

14, 15 and 16 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation and motion estimation modules, (170, 175, 275), of a video encoder 100 and decoder 200 as shown in FIG. 14 and FIG. 15. In some embodiments, entropy coding, and/or decoding modules (145, 230) are also modified. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the size of "LIC-groups" and "minCU-size". The specific values are for example purposes and the aspects described are not limited to these specific values.

FIG. 14 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. The prediction can be built as weighted combination of several predictions (e.g. bi-prediction, generalized bi-prediction or multi-hypothesis prediction). In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of a video decoder 200. In the decoder 200, a bitstream is decoded by the decoder elements as described below. Video decoder 200 generally performs a decoding pass reciprocal to the encoding pass as described in FIG. 14. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, motion compensation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, motion compensation.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, LIC-Flag, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory. "Determining" and "deriving" may be used interchangeably.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for LIC (e.g. a LIC-Flag). In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

- Determine at least one illumination compensation parameter for a current block from one or more illumination compensation parameters determined for another block or from reconstructed samples for another block, e.g. from a neighboring block.
- Illumination compensation parameters of the another block are stored in a buffer;
- The block is a coding unit (CU);
- Determine at least one illumination compensation parameter for a current CU can only occur from another CU in the same Coding Tree Unit (CTU);
- Determine at least one illumination compensation parameter for a current CU can only occur from another CU belonging to the same group of CUs;
- Illumination Compensation Parameters are Local Illumination Compensation (LIC) parameters;
- Encoding (respectively decoding) a flag, e.g. LIC-group-flag-enabled, for a group of CUs indicating whether at least one CU in the group uses illumination compensation for computing prediction;
- Encoding (respectively decoding) a flag for a group of CUs indicating whether another flag, e.g. LIC-flag, is true in the case where it is coded for at least one CU in the group, wherein the another flag indicates for a CU whether illumination compensation is used for predicting this CU;
- The flag is coded (respectively decoded) with the first CU of the group of CUs which is coded in inter mode.
- The flag is coded (respectively decoded) with the first CU of the group of CUs which is coded in inter mode and not in merge mode.
- Encoding (respectively) decoding a flag for a group of CUs indicating whether at least one CU of size smaller (respectively greater) than a value in the group uses illumination compensation for computing prediction;
- The value is coded in the SPS, PPS or slice header;
- Illumination Compensation Parameters for a current block is determined from illumination compensation parameters determined for at least one another block having the same reference index as the current block;
- Illumination Compensation Parameters for a current block is determined from reconstructed samples for at least one another block having the same reference index as the current block;
- Illumination Compensation Parameters for a current block is determined as an average of illumination compensation parameters determined for a plurality of another blocks having the same reference index as the current block;
- A bitstream or signal that includes one or more of the described syntax elements, flags, or variations thereof.
- Inserting in the signaling syntax elements, flags that enable the decoder to adapt block prediction using illumination compensation in a manner corresponding to that used by an encoder.
- Creating and/or transmitting and/or receiving and/or decoding a bitstream or signal that includes one or more of the described syntax elements, flags, or variations thereof.
- A TV, set-top box, cell phone, tablet, or other electronic device that performs illumination compensation according to any of the embodiments described.
- A TV, set-top box, cell phone, tablet, or other electronic device that performs illumination compensation according to any of the embodiments described, and that displays (e.g. using a monitor, screen, or other type of display) a resulting image.
- A TV, set-top box, cell phone, tablet, or other electronic device that tunes (e.g. using a tuner) a channel to receive a signal including an encoded image, and performs illumination compensation according to any of the embodiments described.
- A TV, set-top box, cell phone, tablet, or other electronic device that receives (e.g. using an antenna) a signal over the air that includes an encoded image, and performs illumination compensation according to any of the embodiments described.

According to a general aspect of at least one embodiment, a decoding method is presented that comprises:

- determining at least one illumination compensation parameter for a current block;
- reconstructing said current block using said determined illumination compensation parameter;
- wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to a general aspect of at least one embodiment, a decoding apparatus is presented that comprises one or more processors configured to implement:

- determining at least one illumination compensation parameter for a current block;
- reconstructing said current block using said determined illumination compensation parameter;
- wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to a general aspect of at least one embodiment, an encoding method is presented that comprises:

- determining at least one illumination compensation parameter for a current block;
- reconstructing said current block using said determined illumination compensation parameter;
- wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to a general aspect of at least one embodiment, an encoding apparatus is presented that comprises one or more processors configured to implement:

determining at least one illumination compensation parameter for a current block;

encoding said current block using said determined illumination compensation parameter;

wherein the at least one illumination compensation parameter for the current block is determined from one or more illumination compensation parameters or from one or more reconstructed samples of at least one spatially neighbor block only in the case where said at least one spatially neighbor block belongs to the same local illumination compensation group as the current block, called current local illumination compensation group.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the encoding/decoding methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

In an embodiment, the linear illumination compensation group is either smaller, larger or equal to a coding tree unit.

In an embodiment, in the case where the current block is not located at a top-left position in the same local illumination compensation group, a flag is encoded/decoded indicating whether reconstructing said current block uses said determined illumination compensation parameter.

In an embodiment, in the case where at least one block located above or located to the left of the current block is coded in inter mode, a flag is encoded/decoded indicating whether reconstructing said current block uses said determined illumination compensation parameter.

In an embodiment, a flag is encoded/decoded indicating whether at least one block of the current local illumination compensation group uses illumination compensation for prediction.

In an embodiment, a flag is encoded/decoded indicating whether illumination compensation parameters are to be computed and stored after reconstructing blocks of the current local illumination compensation group.

In an embodiment, a flag is encoded/decoded indicating whether at least one block of the current local illumination compensation group has another flag value which is true in the case where said another flag is explicitly coded, wherein said another flag indicates whether reconstructing said current block uses said determined illumination compensation parameter.

In an embodiment, the flag is encoded/decoded with the first block of the current local illumination compensation group.

In an embodiment, the flag is encoded/decoded with the first block of the current local illumination compensation group not coded in merge mode.

In an embodiment, a flag is encoded/decoded for the current local illumination group indicating whether at least one block in the group whose size is smaller than a value uses illumination compensation for computing prediction.

In an embodiment, a flag is encoded/decoded for the current local illumination group indicating whether at least one block in the group whose size is larger than a value uses illumination compensation for computing prediction.

In an embodiment, the at least one illumination compensation parameter for the current block is determined from one or more illumination compensation parameters or from one or more reconstructed samples of at least one spatially neighbor block belonging to the current local illumination compensation group and having the same reference index as the current block.

In an embodiment, the at least one illumination compensation parameter for the current block is determined as an average of illumination compensation parameters of two spatially neighbor blocks belonging to the current local illumination compensation group and having the same reference index as the current block.

In an embodiment, the at least one illumination compensation parameter for the current block is determined from one or more reconstructed samples of at least one spatially neighbor block belonging to the current local illumination compensation group and having the same reference index as the current block.

The invention claimed is:

1. A method comprising:

obtaining a list of second sets of local illumination parameters for a first coding unit of a current picture, each second set of local illumination parameters defining a local illumination linear model and having been determined for a second coding unit neighboring the first coding unit; and determining a first set of local illumination parameters for the first coding unit based on at least one second set of local illumination parameters of the list depending on a characteristic of at least one second coding unit for which the at least one second set of local illumination parameters had been determined, wherein, for each of the at least one second coding units for which the at least one second set of local illumination parameters had been determined, the characteristic is at least one of a width of the second coding unit, a height of the second coding unit, a length of a common border between the second coding unit and the first coding unit, or a motion vector of the second coding unit.

2. The method of claim 1, wherein the first set of local illumination parameters for the first coding unit depends on a weighted average of one of the at least one second set of local illumination parameters of the list where each weight associated to the second set of local illumination parameters of the list is proportional to the width of the second coding unit for which the second set of local illumination parameters had been determined responsive to the second coding unit is above the first coding unit or to the height of the second coding unit responsive to the second coding unit is on the left of the first coding unit.

3. The method of claim 1, wherein the first set of local illumination parameters for the first coding unit depends on a weighted average of one of the at least one second set of local illumination parameters of the list where each weight associated to the second set of local illumination parameters of the list is proportional to the length of the common border between the second coding unit for which the second set of local illumination parameters had been determined and the first coding unit.

4. The method of claim 1, wherein the first set of local illumination parameters for the first coding unit is based on one of the at least one second set of local illumination parameters of the list associated with the second coding unit whose motion vector is the closest to a motion vector of the first coding unit.

5. The method of claim 1, wherein each second set of local illumination parameters of the list is associated to a second coding unit belonging to a same local illumination group as the first coding unit, a local illumination compensation group being an area of the current picture composed of a subset of contiguous samples of the picture, the picture being divided in a plurality of local illumination compensation groups.

6. The method of claim 1, wherein, if the second coding unit is above the first coding unit, the characteristic is the width of the second coding unit.

7. The method of claim 1, wherein, if the second coding unit is on the left of the first coding unit, the characteristic is the height of the second coding unit.

8. The method of claim 1, wherein the characteristic is the length of the common border between the second coding unit and the first coding unit.

9. A non-transitory information storage medium storing program code instructions for implementing the method according to claim 2.

10. A device comprising electronic circuitry configured for:

obtaining a list second of sets of local illumination parameters for a first coding unit of a current picture, each second set of local illumination parameters defining a local illumination linear model and having been determined for a second coding unit neighboring the first coding unit; and determining a first set of local illumination parameters for the first coding unit based on at least one second set of local illumination parameters of the list depending on a characteristic of at least one second coding unit for which associated to the at least one second set of local illumination parameters had been determined, wherein, for each of the at least one second coding units for which the at least one second set of local illumination parameters had been determined, the characteristic is at least one of a width of the second coding unit, a height of the second coding unit, a length of a common border between the second coding unit and the first coding unit, or a motion vector of the second coding unit.

11. The device of claim 10, wherein the first set of local illumination parameters for the first coding unit depends on a weighted average of one of the at least one second set of local illumination parameters of the list where each weight associated to the second set of local illumination parameters of the list is proportional to the width of the second coding unit for which the second set of local illumination parameters had been determined responsive to the second coding unit is above the first coding unit or to the height of the second coding unit responsive to the second coding unit is on the left of the first coding unit.

12. The device of claim 10, wherein the first set of local illumination parameters for the first coding unit depends on a weighted average of one of the at least one second set of local illumination parameters of the list where each weight associated to the second set of local illumination parameters of the list is proportional to the length of the common border between the second coding unit for which the second set of local illumination parameters had been determined and the first coding unit.

13. The device of claim 10, wherein the first set of local illumination parameters for the first coding unit is based on one of the at least one second set of local illumination parameters of the list associated with the second coding unit whose motion vector is the closest to a motion vector of the first coding unit.

14. The device of claim 10, wherein each second set of local illumination parameters of the list is associated to a second coding unit belonging to a same local illumination group as the first coding unit, a local illumination compensation group being an area of the current picture composed of a subset of contiguous samples of the picture, the picture being divided in a plurality of local illumination compensation groups.

15. The device of claim 10, wherein, if the second coding unit is above the first coding unit, the characteristic is the width of the second coding unit.

16. The device of claim 10, wherein, if the second coding unit is on the left of the first coding unit, the characteristic is the height of the second coding unit.

17. The device of claim 10, wherein the characteristic is the length of the common border between the second coding unit and the first coding unit.

* * * * *